United States Patent
Young et al.

(10) Patent No.: US 9,059,640 B2
(45) Date of Patent: Jun. 16, 2015

(54) CONTROL CIRCUIT FOR A BUCK POWER FACTOR CORRECTION STAGE

(75) Inventors: George Young, Blackrock (IE); Andrew Bernard Keogh, Glanmire (IE); Seamus Martin O'Driscoll, Cloyne (IE); Peter Michael Meaney, Cloyne (IE); William James Long, Cork (IE)

(73) Assignee: TEXAS INSTRUMENTS (CORK) LIMITED, Dublin (IE)

( * ) Notice: Subject to any disclaimer, the term of this patent is extended or adjusted under 35 U.S.C. 154(b) by 1918 days.

(21) Appl. No.: 12/165,959

(22) Filed: Jul. 1, 2008

(65) Prior Publication Data

US 2010/0002469 A1 Jan. 7, 2010

(51) Int. Cl.
*H02M 1/42* (2007.01)
*H02M 3/156* (2006.01)
*H02M 1/00* (2006.01)

(52) U.S. Cl.
CPC ............ *H02M 1/4208* (2013.01); *H02M 3/156* (2013.01); *H02M 2001/0032* (2013.01); *H02M 2001/4291* (2013.01); *Y02B 70/126* (2013.01); *Y02B 70/16* (2013.01)

(58) Field of Classification Search
USPC .................................................. 323/282–288
See application file for complete search history.

(56) References Cited

U.S. PATENT DOCUMENTS

| | | | |
|---|---|---|---|
| 5,088,019 A * | 2/1992 | Williams et al. | 363/69 |
| 6,952,354 B1 * | 10/2005 | Yang et al. | 363/16 |
| 7,816,900 B2 * | 10/2010 | Brown | 323/285 |
| 7,911,812 B2 * | 3/2011 | Colbeck et al. | 363/21.02 |

FOREIGN PATENT DOCUMENTS

WO       WO 2007042517 A2 *   4/2007

* cited by examiner

*Primary Examiner* — Jessica Han
(74) *Attorney, Agent, or Firm* — William B. Kempler; Frank D. Cimino

(57) ABSTRACT

This invention relates to a control circuit for a buck power factor correction (PFC) stage. Buck PFC stages are commonly used in low cost, high efficiency power converters. These buck PFC stages are typically controlled using a very slow control loop with a crossover frequency of the order of 10 to 20 Hz. However, such a slow response is unsuitable for applications requiring overvoltage protection. The present invention overcomes the problems with the known control circuits for buck PFC stages by implementing a two stage control circuit having a fast outer loop control circuit and a slow inner loop control circuit. The fast outer loop control circuit is in operation during low load conditions and the slow inner loop control circuit is only active under load.

34 Claims, 2 Drawing Sheets

CONTROL CIRCUIT FOR A BUCK POWER FACTOR CORRECTION STAGE

BACKGROUND OF THE INVENTION

This invention relates to a control circuit for a buck power factor correction (PFC) stage. Buck PFC stages are commonly used in high efficiency (90%+), low cost power converters. Typically, the buck PFC stage is designed in such a manner that the control loop for the PFC stage is very slow. For example, it is not uncommon for a buck PFC stage to be implemented with a crossover frequency of the order of 10 Hz to 20 Hz. Such a crossover frequency is necessary if appropriate power factor and line current harmonics performance are to be ensured, with contained current distortion over the line cycle.

However, there are problems with having such a slow control loop. For example, a slow loop response is incompatible with the need for a fast response required in addressing overvoltage conditions. One common requirement of many PFC stages is that a minimum duty-cycle condition is maintained. In the event of having to maintain a minimum duty-cycle during light load conditions, an overvoltage condition can occur quite readily.

It is an object of the present invention to provide a control circuit and a control methodology for a PFC stage that overcomes at least some of the problems with the known types of control circuits and methodologies. It is a further object of the present invention to provide a control circuit that achieves optimal light-load performance consistent with good harmonics performance at higher load conditions.

SUMMARY OF THE INVENTION

According to the invention there is provided a control circuit for a buck Power Factor Correction (PFC) stage, the control circuit comprising a two stage control circuit having a fast outer loop control circuit and a slow inner loop control circuit. By having such a control circuit, it is possible to provide a sufficiently quick response to an overvoltage condition thereby protecting the components against an overvoltage condition. Furthermore, the control circuit will perform relatively well at both light load conditions and higher load conditions.

In one embodiment of the invention, the control circuit has voltage sensing means and means responsive to the voltage sensing means to activate the slow inner loop control circuit under normal load conditions and means to activate the fast outer loop under light load conditions.

In another embodiment of the invention, the control circuit has means to limit the PFC stage duty cycle and current in response to the control input. Typically, the control circuit implements a voltage mode approach with a control ramp. The current ramp is fed to a current sense pin of a controller. In one embodiment of the invention, the control circuit additionally implements a partial current feedback approach.

In another embodiment of the invention, the fast loop control circuit has means to turn off a controller fully. Alternatively, the fast loop control circuit operates the controller at a small duty cycle. In a further alternative, the fast loop control circuit operates the controller at just above a minimum level specific to the controller employed. It is envisaged that the fast loop control circuit may have means to selectively operate a controller in one of two or more of the operation methods described above.

In a one embodiment of the invention, a hysteresis function is incorporated in the fast outer loop control circuit. In one embodiment of the invention, a delay function is incorporated in the fast outer loop control circuit. In another embodiment of the invention, the fast outer loop control circuit has means to generate a saw-tooth voltage waveform and provide the saw-tooth voltage waveform to a bulk capacitor of the buck PFC. In a further embodiment of the invention, the period when switching of a controller is enabled is limited to a small region, typically less than 10% of the total cycle time.

In one embodiment of the invention, the control circuit further comprises a main error amplifier. In another embodiment of the invention, an output of the main error amplifier is arranged to pull down on a control pin of a controller with an offset. In a further embodiment of the invention, there is provided a diode in the path of the output of the main error amplifier.

In another embodiment of the invention, the fast loop control circuit is arranged to be active under normal, light load conditions. In one embodiment of the invention there is provided a control circuit in which an overvoltage protection circuit is provided. In one embodiment of the invention, the overvoltage protection circuit comprises a crowbar protection circuit. Preferably, the crowbar protection circuit is arranged in parallel to the bulk capacitor. In a further embodiment of the invention there is provided a control circuit in which there is further provided an additional, separate overvoltage sensing circuit.

In one embodiment of the invention, the slow inner loop control circuit is operated using average current mode control. In one embodiment of the invention, the average current mode control is implemented using integration of a control signal derived from a current sense transformer. In a further embodiment of the invention, the average current mode control is implemented using a PFC error amplifier.

In one embodiment of the invention, the fast outer loop is implemented using controllers referenced to a bulk capacitor low-side rail with a plurality of optocouplers feeding loop conditions to a controller referenced to the input low side rail. It is envisaged that a plurality of protection optocouplers are used.

In one embodiment of the invention, there is a standby stage downstream of the PFC controller. In a further embodiment of the invention, the buck PFC is a double ended buck PFC.

In one embodiment of the invention, the slow inner loop control circuit has a crossover frequency of the order of less than 20 Hz. In one embodiment of the invention, the fast outer loop control circuit has a crossover frequency of the order of greater than 1 kHz. In a further embodiment of the invention, the control circuit has means to implement a minimum duty cycle approach with leading edge blanking.

In one embodiment of the invention, the control circuit produces a control input signal, and in which the control input signal is generated at signal voltage levels compatible with a controller used.

DETAILED DESCRIPTION OF THE INVENTION

Figure 1:
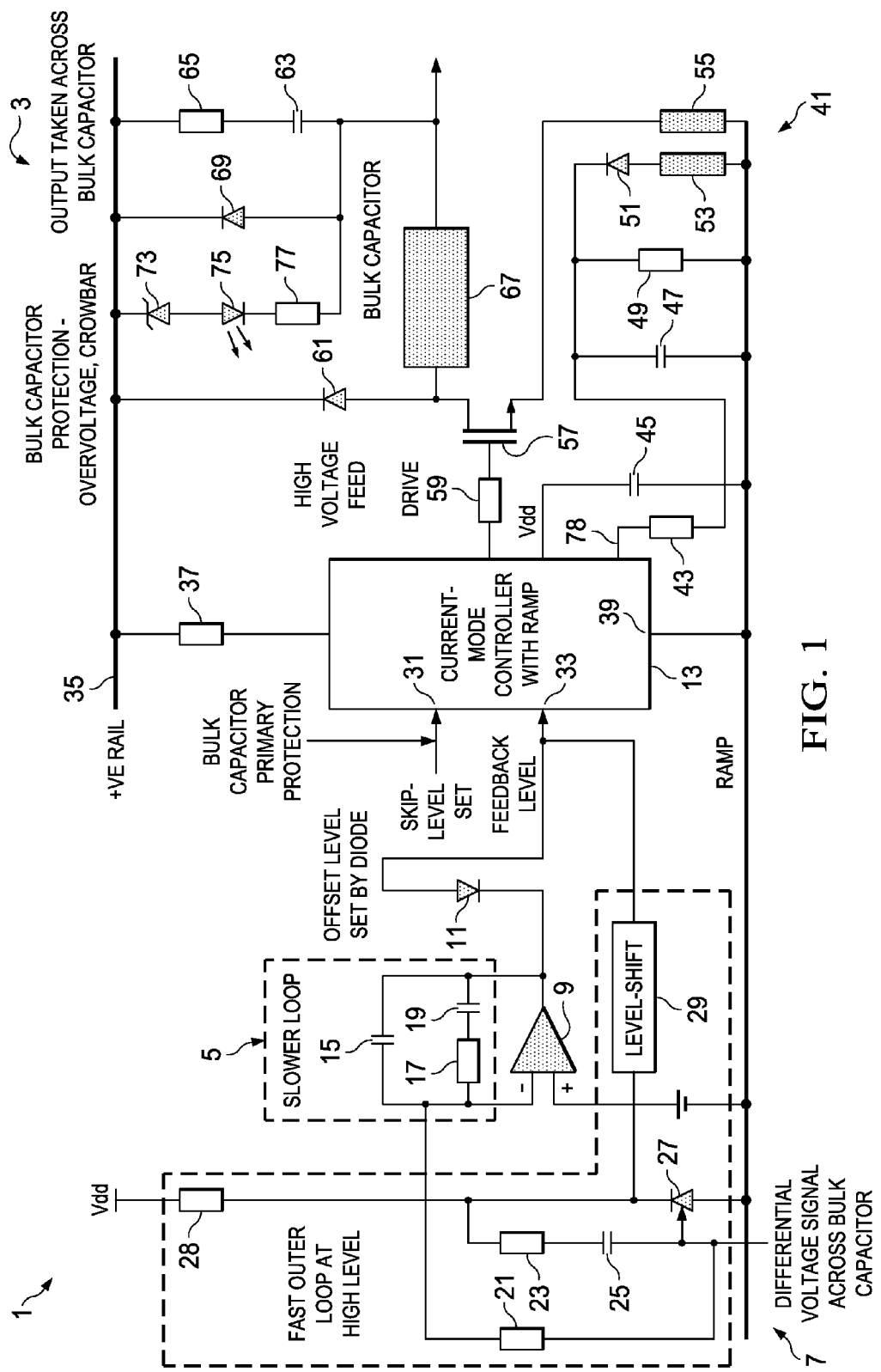
FIG. 1 is a schematic representation of a control circuit for a PFC stage according to the present invention.

Referring to the drawings and initially to FIG. 1 thereof, there is shown a control circuit, indicated generally by the reference numeral 1, for a buck PFC stage, indicated generally by the reference numeral 3. The control circuit 1 comprises a slow inner loop control circuit 5 and a fast outer loop control circuit 7.

The control circuit 1 comprises a main error amplifier, provided by an operational amplifier 9, a diode 11 connected to the output of the error amplifier and a controller 13 fed from the error amplifier 9. The controller 13 is a current mode controller with ramp. The slow inner loop control circuit 5 comprises a capacitor 15, a resistor 17 and a further capacitor 19. The fast outer loop control circuit 7 comprises a pair of resistors 21, 23, a capacitor 25, a diode 27, a further resistor 28 and a level shift device 29. The controller 13 is provided with a number of inputs including a skip level set input 31 and a feedback level input 33. The controller 13 is connected to a positive rail 35 fed via a resistor 37 and a ground rail via connection 39.

A ramp circuit, indicated generally by the reference numeral 41 is connected to the controller 13 and in turn comprises a resistor 43, a capacitor 45, a second capacitor 47, a second resistor 49, a diode 51 and a current sense transformer comprising a pair of windings 53, 55. The control input signal generated by the controller to drive the buck PFC 3 is passed to a MOSFET 57 via resistor 59. The buck PFC stage 3 comprises a buck freewheeling diode 61, a bulk capacitor 63, a resistor 65, an inductor 67 and a diode 69. An overvoltage protection circuit, in this instance a crowbar circuit 71, is provided for the bulk capacitor. A crowbar is essentially a controllable short circuit and is arranged across the bulk capacitor to short circuit the bulk capacitor 63 in case of over voltage conditions on the positive rail 35. The overvoltage sense circuit comprises a Zener diode 73, an optocoupler input light emitting diode (LED) 75 and a resistor 77.

In use, there are a number of methods to ensure that at light loads a high efficiency burst mode operation will be achieved. One method is to use a control separation such that the fast outer loop control circuit is in operation during low load conditions and the slow inner loop control circuit is only active under load. A minimum duty-cycle approach with leading edge blanking will typically be used in order to avoid conditions of false tripping. In the embodiment shown, the arrangement is such that the control input generated by the controller 13 is controlled at low levels solely by the fast loop control circuit 7. The control input limits duty cycle and current, given a primarily voltage-mode approach with a control ramp fed to the current-sense pin 78. This fast outer loop control circuit is arranged to be able to turn off the controller 13 fully, or else operate the controller at a small duty cycle at or just above the minimum level specific to the controller employed. Different controllers will have different blanking periods and therefore the duty cycle may be partially dependent on the specific controller used. Another method to achieve high light load efficiency is to allow the slow loop error amplifier maintain control and implement "burst mode" by means of separate skip cycle circuitry. For this scheme the fast outer loop will act to provide over voltage limitation during load or line transients.

If a delay or hysteresis function is incorporated in the loop, then the fast outer loop control circuit 7 under these conditions can be expected to provide a saw-tooth voltage waveform on the bulk capacitor 63, with the period when switching of the control circuit is enabled is limited to a very small region. This ensures that the power dissipation of the control circuit 1 and indeed of the power-factor correction stage 3 is limited under light load conditions. The output of the main error amplifier 9 can then be configured such that this pulls down on the control pin with an offset, typically as provided by having the diode 11 in the path to the control pin. As an alternative to the diode, a transistor base-emitter junction could be used. This ensures that the main amplifier 9 becomes active at heavier load conditions, giving good power factor under such conditions.

This dual loop control property is particularly advantageous when for example a standby stage (not shown) is operated downstream of the PFC stage 3, given the normal stringent requirements on no-load and light-load operating power of power converters. Operating the standby supply from the limited operating voltage range as obtained from across the bulk capacitor 63 enhances the operating efficiency of the standby supply and contains common-mode noise. These factors make this arrangement attractive if the PFC stage 3 can operate with very high efficiency across load, as is facilitated by the technique described above.

It will be recognized under these conditions that the fast loop control circuit 7 is designed to be active under normal, but light-load, conditions. Light load conditions are deemed to be in the region of 10% of the rated load for the converter. For example, for a converter rated at 50 W, the device would operate in this fashion up to in the region of 5 W. A corollary of this is that such a loop cannot implement overvoltage protection in any event, and thus separate overvoltage protection is required. A "crowbar-type" protection implementation is appropriate for the bulk capacitor 63, and this may be supplemented by a separate overvoltage sensing protection device. This separate overvoltage sensing protection function may be implemented by device 69. The device 69 may be implemented by means of a Sidactor device. Such a device simultaneously incorporates both Zener type voltage sensing and crowbar functionality.

It is also noted that operation of the slower loop in the buck PFC control can be facilitated by usage of average current mode control. A close approximation to this position can be obtained by integration of the signal as derived from a current-sense transformer (not shown). As an alternative embodiment, the approach may be implemented with the PFC error amplifier and the fast loop implemented using controllers referenced to the bulk capacitor low-side rail, with optocouplers feeding the loop conditions to a controller referenced to the input low-side rail. A protection optocoupler can also be used. The protection optocouplers are designed typically for 500V isolation and do not have any unusual requirements in terms of speed or common-mode performance and thus low-cost parts can be deployed in these positions. It is envisaged that the control approach described above has particular applicability in the case of "double ended" buck PFC converters.

Figure 2:
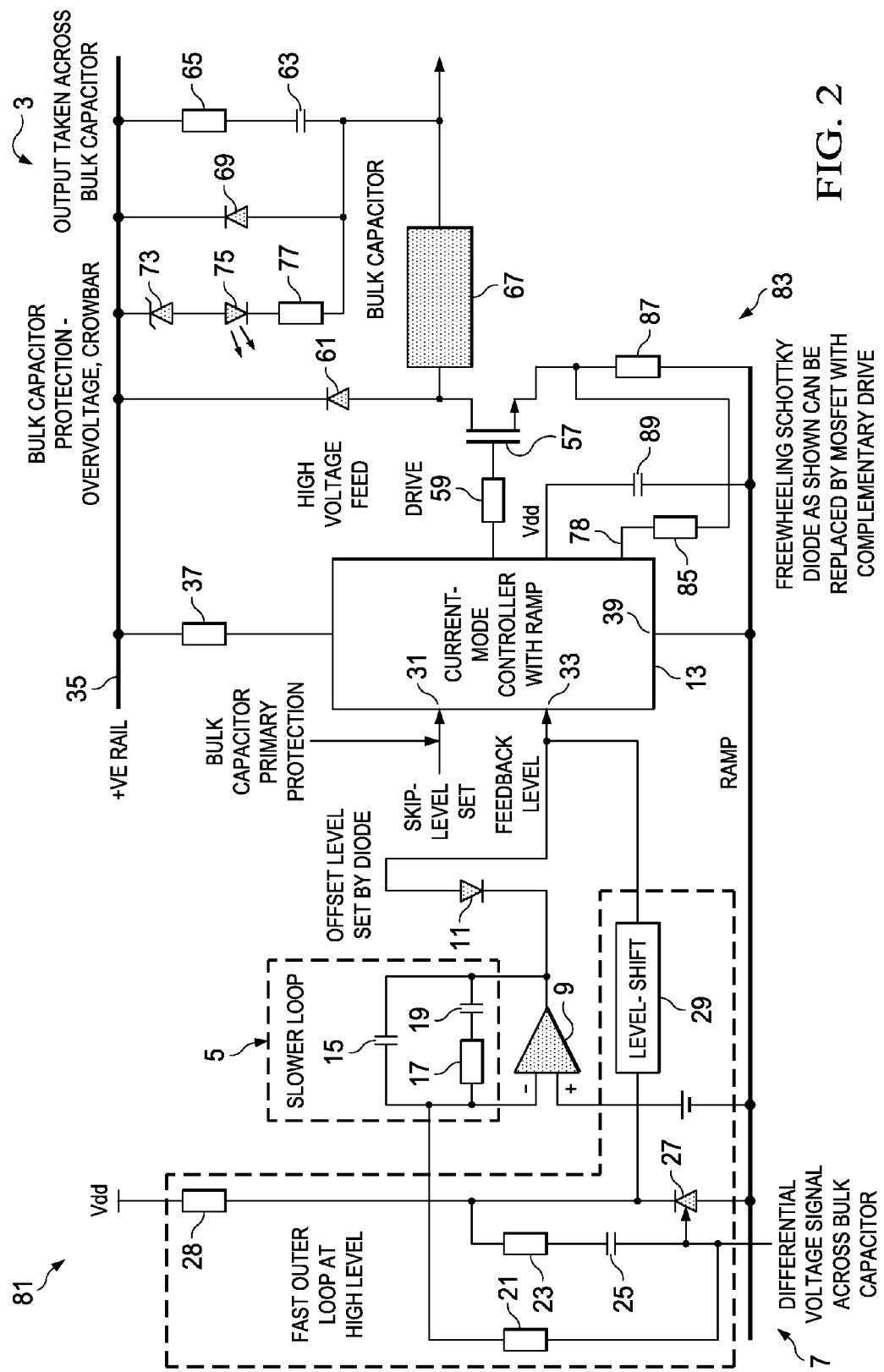
FIG. 2 is a schematic representation of an alternative embodiment of control circuit for a PFC stage according to the present invention.

Referring to FIG. 2 of the drawings, there is shown an alternative construction of control circuit for a buck PFC stage, indicated generally by the reference numeral 81, according to the present invention where like parts have been given the same reference numeral as before. The embodiment shown differs from the embodiment shown in FIG. 1 in that the ramp circuit 83 comprises a pair of resistors 85, 87 and a capacitor 89.

In the embodiments shown, the slow inner loop control circuit has a crossover frequency of the order of less than 20 Hz whereas the fast outer loop control circuit has a crossover frequency of the order of greater than 1 kHz.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the specification.

What is claimed is:

1. A control circuit for a buck Power Factor Correction (PFC) stage to change a waveshape of input current so that a load appears to be resistive, the control circuit comprising a two stage control circuit having a faster outer loop voltage control circuit having a crossover frequency greater than 1 kHz and a slower inner loop average current control circuit; wherein the control circuit controls the buck PFC stage duty cycle and current; and
   the control circuit has voltage sensing means and means responsive to the voltage sensing means to activate the faster outer loop under light load conditions substantially less than 10% of rated load and means to activate the slower inner loop control circuit under other load conditions.

2. The control circuit as claimed in claim 1 in which the slower inner loop control circuit has a crossover frequency of the order of less than 20 Hz.

3. The control circuit as claimed in claim 2 in which the control circuit has means to limit the PFC stage duty cycle and current in response to a control input.

4. The control circuit as claimed in claim 3 in which the control circuit implements voltage control with a control ramp.

5. The control circuit as claimed in claim 1 in which the control circuit additionally implements current feedback control.

6. The control circuit as claimed in claim 1 in which the control circuit has means to limit the PFC stage duty cycle and current in response to a control input.

7. The control circuit as claimed in claim 6 in which the control circuit implements voltage control with a control ramp.

8. The control circuit as claimed in claim 7 in which the control circuit additionally implements current feedback control.

9. The control circuit as claimed in claim 1 in which the faster loop control circuit has means to turn off a controller.

10. The control circuit as claimed in claim 1 in which the faster loop control circuit has means to operate a controller at a relatively low duty cycle.

11. The control circuit as claimed in claim 1 in which the faster loop control circuit has means to operate a controller at a minimum duty cycle required by the controller employed.

12. The control circuit as claimed in claim 1 in which a hysteresis function is incorporated in the faster outer loop control circuit.

13. The control circuit as claimed in claim 12 in which the faster outer loop control circuit has means to generate a saw-tooth voltage waveform and provide the saw-tooth voltage waveform to a bulk capacitor of the buck PFC.

14. The control circuit as claimed in claim 13 in which the period when switching of a controller is enabled is limited to less than 10% of the total cycle time.

15. The control circuit as claimed in claim 1 in which a delay function is incorporated in the faster outer loop control circuit.

16. The control circuit as claimed in claim 15 in which the faster outer loop control circuit has means to generate a saw-tooth voltage waveform and provide the saw-tooth voltage waveform to a bulk capacitor of the buck PFC.

17. The control circuit as claimed in claim 16 in which the period when switching of a controller is enabled is limited to less than 10% of the total cycle time.

18. The control circuit as claimed in claim 1 in which the control circuit further comprises a main error amplifier.

19. The control circuit as claimed in claim 18 in which an output of the main error amplifier is arranged to control a controller via a signal on a control pin of the controller providing an offset.

20. The control circuit as claimed in claim 19 in which there is provided a diode in the path of the output of the main error amplifier.

21. The control circuit as claimed in claim 1 in which the faster loop control circuit is arranged to be active under, light load conditions and other load conditions.

22. The control circuit as claimed in claim 21 in which an overvoltage protection circuit is provided.

23. The control circuit as claimed in claim 22 in which the overvoltage protection circuit comprises a crowbar protection circuit.

24. The control circuit as claimed in claim 23 in which the crowbar protection circuit is arranged in parallel to a bulk capacitor of the buck PFC stage.

25. The control circuit as claimed in claim 22 in which there is further provided an additional, separate overvoltage sensing circuit.

26. The control circuit as claimed in claim 25 in which the overvoltage sensing circuit comprises a Sidactor device.

27. The control circuit as claimed in claim 1 in which the average current mode control is implemented using integration of a control signal derived from a current sense transformer.

28. The control circuit as claimed in claim 1 in which the average current mode control is implemented using a PFC error amplifier.

29. The control circuit as claimed in claim 1 in which the faster outer loop is implemented using controllers referenced to a bulk capacitor low-side rail with a plurality of optocouplers feeding loop conditions to a controller referenced to the input low side rail.

30. The control circuit as claimed in claim 1 in which the control circuit has means to implement a minimum duty cycle approach with leading edge blanking.

31. The control circuit as claimed in claim 1 in which the control circuit produces a control input signal, and in which the control input signal is generated at signal voltage levels compatible with a controller used.

32. The control circuit as claimed in claim 1 in which the faster outer loop control circuit comprises a plurality of resistors, a capacitor, a diode and a level shift device.

33. The control circuit as claimed in claim 1 in which the slower inner loop control circuit comprises a pair of capacitors and a resistor.

34. A control circuit according to claim 1 wherein the control circuit has voltage sensing means and means responsive to the voltage sensing means to activate the faster outer loop under light load conditions and means to activate the slower inner loop control circuit under other load conditions, the control circuit having means to limit the PFC stage duty cycle and current in response to a control ramp and partial current feedback, and having a main error amplifier with a diode in a path of the output of the main error amplifier and arranged to control the controller via a single on a pin of the controller providing an offset, wherein the buck PFC control circuit produces a control input signal generated at signal voltage levels compatible with the controller used;
   the faster loop having means to operate a controller at a duty cycle just above a minimum level, being less than substantially 10% of the total cycle time, the faster loop comprising a hysteresis function and having means to generate a saw-tooth voltage waveform and provide the saw-tooth voltage waveform to a bulk capacitor, the faster loop using controllers referenced to a bulk capacitor low-side rail with a plurality of optocouplers feeding loop conditions to a controller referenced to an input low-side rail the faster outer loop comprising a plurality of resistors, a capacitor, a diode and a level shift device;

the slower loop being operated using an average current mode control implemented using integration of a control signal derived from a current sense transformer and a PFC error amplifier and the slower loop having a crossover frequency of the order of less than 20 Hz; the slower inner loop comprising a pair of capacitors and a resistor.

* * * * *